United States Patent Office 3,320,299
Patented May 16, 1967

3,320,299
ALKYL MERCAPTOMETHYL THIONO-CARBAMATES
Ivan C. Popoff, Ambler, Pa., assignor to Pennsalt Chemicals Corporation, Philadelphia, Pa., a corporation of Pennsylvania
No Drawing. Filed June 23, 1964, Ser. No. 377,411
4 Claims. (Cl. 260—455)

This invention relates to certain alkylmercaptomethyl thionocarbamates and their use as agricultural herbicides. More particularly, the invention deals with the process of controlling the growth and/or destroying vegetation by applying as a toxicant a herbicidal amount of a compound having the structure

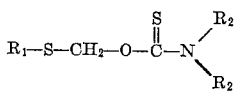

where $R_1$ is an alkyl group containing from about 8 to about 12 carbon atoms and $R_2$ are lower alkyl groups which may be the same or different. The invention also embodies herbicidal compositions comprising a carrier and as an active agent a compound of the above structure.

The need for agricultural herbicides is well known and it is well recognized that such herbicides should be selective in their effect; i.e. when a herbicide is applied to agricultural crops it should restrict the growth or kill the undesirable weeds, but should permit the desirable crops to grow and mature without significant damage. Such selectivity in compounds which affect plants is frequently difficult to achieve and it is therefore important from a practical, as well as an economic standpoint, that new agricultural herbicides be found which show variations in selectivity.

It has now been found that the compounds described by the above formula are active as plant herbicides and have desirable selectivity in that they permit desirable crops to emerge from treated areas while still maintaining herbicidal activity against undesirable weeds. The active agents of the invention will be used on crops and plant life at a concentration ranging from about 5 to about 20 pounds per acre, and preferably will be used at about 7 to 15 pounds per acre.

The detailed techniques of formulating and using herbicides in various formulations are well known in the art. For example, formulations of active agents are taught by Todd in U.S. Patents Nos. 2,655,444 to 2,655,447 and the disclosed techniques may be used to formulate the agents of this invention. The use of dust, solvents, wetting, dispersing and emulsifying agents for herbicidal preparations is also disclosed in U.S. 2,426,417 which techniques are applicable to this invention. For example, a mineral oil fraction such as kerosene or diesel oil, or a coal tar oil and oils of vegetable and animal origin can be used as solvent carriers for the solid active agent and the solution thus formed can be sprayed directly on seeded areas. Aromatic hydrocarbons are particularly useful solvents, as for example, xylene, toluene etc. The active agent according to this invention is added to such oils with or without the use of emulsifiers and disperants. Other carriers useful for formulating the agents are low boiling alcohols (for example, ethyl or isopropyl alcohols); ketones such as acetone or cyclohexanol; hydrocarbons such as benzene, tetrahydronaphthalene; chlorinated hydrocarbons, such as tetrachloromethane or ethylene chloride; and the like.

Aqueous formulations are made from emulsion and dispersion concentrates by adding water. The active agent, alone or dissolved in one of the above named solvents, is homogeneously incorporated into water, preferably by means of wetting and/or dispersing agents. Examples of the useful cation active emulsifiers as dispersing agents are quaternary ammonium compounds; examples of anion active emulsifying agents are soaps, soft soap, long chain aliphatic sulfuric acid monoesters, alkyl aryl sulfonic acids, and long chain alkoxy acidic acids; examples of non-ionic emulsifiers are polyglycolethers, fatty alcohols and polyethylene oxide condensation products. Also, concentrates can be produced consisting of the active agent, emulsifier or dispersing agent, and, if necessary, a solvent. These latter are also suitable for dilution with water.

In addition to preparing the active agent in a liquid carrier as described above, dusts can be produced by mixing or blending the agent with a solid carrier. Examples of such solid carriers are talc, diatomaceous earth, kaolin, bentonite, calcium carbonate, boric acid, tricalcium phosphate, sawdust, powdered cork, charcoal and other materials of vegetable origin. On the other hand, the carriers can be impregnated by means of a volatile solvent containing the active agent. Dusts and pastes can be suspended in water by the addition of wetting agents and protective colloids.

Concentration of active agent in any particular formulation will, of course, vary in accord with the particular application contemplated. In general, however, the active concentration in the formulation will be about 0.1 and about 60% by weight of the formulation.

The active agents will have the structure shown above and may be named as alkylmercaptomethyl thionocarbamates. As indicated, $R_1$ will be a long chain alkyl group containing from about 8 to about 12 carbon atoms while the $R_2$ groups will be lower alkyl groups. The active compounds contemplated in the scope of this invention will include octylmercaptomethyl N,N-dimethylthionocarbamate, tert-nonylmercaptomethyl N,N-diethylthionocarbamate, n-decylmercaptomethyl N,-N-diisopropylthionocarbamate, tert-dodecylmercaptomethyl N,N-diisobutylthionocarbamate and the like.

The compounds of the invention are oils which may be formulated into active herbicidal compositions either in pure form or in the crude state. The compounds are prepared quite readily by the reaction of an N,N-di-lower alkylthiocarbamyl chloride with the appropriate long chain alkyl hydroxymethyl sulfide, which latter compound is prepared from the long chain alkyl mercaptan and formaldehyde.

The chemical reactions which illustrate the preparation of compounds are as follows:

$$R_1-SH + HCHO \longrightarrow R_1-S-CH_2-OH$$

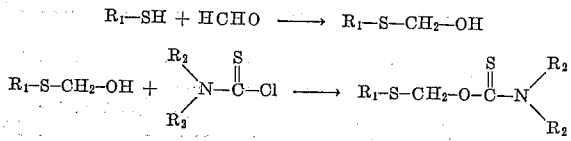

EXAMPLE 1.—TERT-NONYLMERCAPTOMETHYL N,N-DIETHYLTHIONOCARBAMATE

A mixture of 1440 grams (9.0 moles) of tert-nonylmercaptan and 738 grams (9.0 moles) of 37% aqueous formaldehyde is stirred for 23 hours at 27 to 30° C. for 2 hours at 50 to 65° C., and then for 2 hours at 90° C. The organic layer is separated and dried with 120 grams of anhydrous sodium sulfate to obtain 1683 grams (98.5% based on mercaptan) of tert-nonyl hydroxymethyl sulfide, which product on elemental analysis corresponds to the correct theoretical values as follows:

Percent found/percent calculated: C—63.21/63.10; S—16.67/16.84. The product thus obtained is a light yellow oil which is used for reaction with N,N-diethylthiocarbamyl chloride as follows:

A solution of 47.5 grams (0.25 mole) of the tert-nonyl hydroxymethyl sulfide, 38 grams (0.25 mole) of N,N-diethylthiocarbamyl chloride and 50 grams (0.5 mole) of triethylamine is placed in 300 cc. of toluene and stirred for 48.5 hours at 50° C. The reaction mixture is then filtered to remove the triethylamine hydrochloride which forms (68.5% of theoretical) and the filtrate is washed with water to remove the triethylamine hydrochloride which is dissolved in the reaction mixture. The solvent and excess of triethylamine are removed by distillation under vacuum.

The yellowish oily residue of 69.5 grams (90.8% of theoretical yield) is the crude tert-nonylmercaptomethyl N,N-diethylthionocarbamate.

EXAMPLE 2.—TERT-DODECYLMERCAPTOMETHYL N,N-DIETHYLTHIONOCARBAMATE

A mixture of 202 grams (1.0 mole) of tert-dodecylmercaptan and 82 grams (1.0 mole) of 37% aqueous formaldehyde is stirred for 21 hours at 25 to 30° C., 2 hours at 50° C., 2 hours at 80° C. and 2 hours at 90 to 100° C. The organic layer is separated to obtain 231.7 grams (100% yield) of a clear brownish oil representing crude tert-dodecyl hydroxymethyl sulfide. The tert-dodecyl hydroxymethyl sulfide is treated with diethylthiocarbamyl chloride as in Example 1 to yield tert-dodecylmercaptomethyl N,N-diethylthionocarbamate product.

EXAMPLE 3.—TERT-NONYLMERCAPTOMETHYL N,N-DIMETHYLTHIONOCARBAMATE

A solution of 47.5 g. (0.25 mole) tert-nonyl hydroxymethyl sulfide, 31.0 g. (0.25 mole) N,N-dimethylthiocarbamyl chloride and 50.0 g. (0.5 mole) triethylamine in 150 cc. toluene is stirred for 15 hours at 50° C. and is filtered to remove 29.5 g. (85.7% of theoretical) of triethylamine hydrochloride. The filtrate is washed with water to remove the triethylamine hydrochloride which is dissolved in the reaction mixture. The solvent and the excess of triethylamine are removed by distillation under vacuum. The yellow oily distillation residue, 55.5 g. (80% of theoretical) is the crude tert-nonylmercaptomethyl N,N-dimethylthionocarbamate.

EXAMPLE 4

Specific formulations which exemplify the invention are as follows:

A. Liquid formulations (1) Sprayable Liquid

| Components: | Parts by weight |
|---|---|
| Formulation 1— | |
| Diacetone alcohol | 90 |
| n-Octylmercaptomethyl N,N - dimethylthionocarbamate | 10 |
| Formulation 2— | |
| Stoddard's solvent | 80 |
| Xylene | 10 |
| Tert - dodecylmercaptomethyl N,N-diethylthionocarbamate | 10 |

(2) Concentrate for aqueous emulsion

| Components: | Parts by weight |
|---|---|
| Xylene | 2.98 |
| Alkyl aryl polyether alcohol ("Triton" X–155) | 0.77 |
| Tert-dodecylmercaptomethyl N,N-diethylthionocarbamate | 4.00 |

B. Dry formulations (1) Wettable powder

| Components: | Parts by weight |
|---|---|
| Wetting agent | 2 |
| Lignin sulfonate ("Marasperse"–N) | 2 |
| Clay powder ("Attaclay") | 71 |
| n-Decylmercaptomethyl N,N-diethylthionocarbamate | 25 |

(2) Granules

| Components: | Parts by weight |
|---|---|
| Clay granules of 30–60 mesh | 80 |
| Xylene | 15 |
| Tert-nonylmercaptomethyl N,N-diethylthionocarbamate | 5 |

A solution of the herbicide in xylene is sprayed onto the clay granules while rotating in a drum.

EXAMPLE 5.—HERBICIDAL EVALUATIONS—PRE-EMERGENT APPLICATION

A 10% by weight solution of tert-nonylmercaptomethyl N,N-diethylthionocarbamate in diacetone alcohol is sprayed onto a soil surface in which seeds of weeds and crops have previously been planted. The treated soil is held in a greenhouse under the usual conditions of sunlight and watering and is observed periodically. The following table shows the application rates and data obtained:

Application of

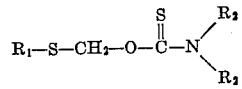

to weeds and crops at 10 pounds per acre.

TABLE I

| Weeds | Pre-emergence Percent Kill | |
|---|---|---|
| | $R_1$=tert-nonyl $R_2$=methyl | $R_1$=tert-nonyl $R_2$=ethyl |
| Foxtail | 60 | 70 |
| Crabgrass | 90 | 68 |
| Lamb's-quarter | | 90 |
| Amaranthus | 49 | 75 |
| Purslane | 65 | 80 |

| Crops | Percent Emergence | |
|---|---|---|
| Sugar beets | 33 | 45 |
| Cotton | 60 | 70 |
| Peas | 50 | 70 |
| Soybeans | 80 | 70 |
| Flax | 52 | 44 |

It is clear from the above examples that the compounds of the invention are effective herbicides of particular value in pre-emergent applications. Surprisingly, when $R_1$ is lower alkyl and the compound is a thiolcarbamate rather than a thionocarbamate, the emergence of crops is severely limited. For example, when methylmercaptomethyl N,N-diethylthiolcarbamate

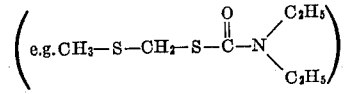

is used at 10 pounds per acre, weeds are effectively killed, but the crops are also adversely affected so that crop emergence is very poor.

When tert-dodecylmercaptomethyl N,N-diethylthionocarbamate is used as a herbicide as in Example 5, essentially the same herbicidal effects are obtained as are obtained with tert-nonylmercaptomethyl N,N-diethylthionocarbamate.

It will be understood that numerous changes and variations may be made from the above description of the invention without departing from its spirit and scope.

I claim:
1. Compounds having the structure

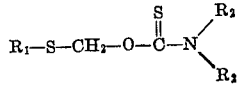

where $R_1$ is an alkyl group containing from 8 to 12 carbon atoms and $R_2$ is a lower alkyl group.

2. Tert-nonylmercaptomethyl N,N-dimethylthionocarbamate.
3. Tert-nonylmercaptomethyl N,N-diethylthionocarbamate.
4. Tert-dodecylmercaptomethyl N,N-diethylthionocarbamate.

References Cited by the Examiner

UNITED STATES PATENTS

| | | | |
|---|---|---|---|
| 2,786,866 | 3/1957 | Hook et al. | 260—455 |
| 2,910,498 | 10/1959 | Meuly | 260—455 |
| 2,993,775 | 7/1961 | Baker | 71—2.7 |
| 3,006,751 | 10/1961 | Brugmann et al. | 71—2.7 |

OTHER REFERENCES

Klopping et al.: Chemical Abstract, vol. 46, 5241g, 1952.

CHARLES B. PARKER, *Primary Examiner.*

JAMES O. THOMAS, JR., *Examiner.*

A. J. ADAMCIK, B. BILLIAN, *Assistant Examiners.*